Oct. 28, 1952  H. O. PUTT  2,615,303
ROTARY TURBINE TYPE FLUID COUPLING
Filed Nov. 25, 1947  3 Sheets-Sheet 1

HARLIE O. PUTT.
INVENTOR

BY Oltsch & Knoblock.
ATTORNEYS

Oct. 28, 1952            H. O. PUTT            2,615,303
ROTARY TURBINE TYPE FLUID COUPLING

Filed Nov. 25, 1947            3 Sheets-Sheet 2

HARLIE O. PUTT.
INVENTOR

BY
*Ottsch y Knoblock.*
ATTORNEYS

Oct. 28, 1952      H. O. PUTT      2,615,303
ROTARY TURBINE TYPE FLUID COUPLING

Filed Nov. 25, 1947      3 Sheets-Sheet 3

HARLIE O. PUTT.
INVENTOR

BY Oltsch & Knoblock.
ATTORNEYS

Patented Oct. 28, 1952

2,615,303

UNITED STATES PATENT OFFICE 2,615,303

ROTARY TURBINE TYPE FLUID COUPLING

Harlie Ogden Putt, Elkhart, Ind., assignor of fifteen per cent to J. Edward Schroeder, fifteen per cent to Bernard A. Scheibelhut, fifteen per cent to Louis J. Schroeder, and fifteen per cent to Mary Schroeder, all of Mishawaka, and fifteen per cent to F. Armand Schellinger, South Bend, Ind.

Application November 25, 1947, Serial No. 787,954

2 Claims. (Cl. 60—54)

This invention relates to improvements in a rotary turbine type fluid coupling, and particularly to a device by means of which rotation is imparted by a driving shaft to a driven shaft through means wherein the coupling action is effected by a liquid of high viscosity.

The primary object of this invention is to provide a device of this character wherein maximum torque is produced at minimum peripheral speeds of the rotating parts as compared to prior devices of this general type, thereby permitting greatly reduced dimensions of said parts as compared with previous devices.

A further object is to provide a device of this character wherein a liquid having a relatively high viscosity compared to the viscosity of the fluid commonly used in conventional fluid couplings may be employed, so that a high rate of acceleration of the driven part per unit increase in speed of the driving rotor may be secured to reduce the degree and time element of shearing action of the liquid incident to slippage or relative rotation of the driving and driven parts, and at the same time the desired slippage or relative rotation of the driving and driven parts at idling or low rotative speeds may be secured.

A further object is to provide a device that may be positioned in the torque tube drive transmission of an automobile either between the conventional gear transmission and the differential housing of the automobile or which may be coupled direct to the crankshaft of the motor ahead of the gear transmission.

A further object is to provide a device of relatively small dimensions having a high torque capacity at conventional speeds and any desired rotor slip at low rotative speeds or which may be designed to provide relatively high torque at relatively low speeds with a minimum of slip, and which device is simple in construction, easy to assemble, and inexpensive in cost.

Others objects will be apparent from the following specification.

Figure 1:
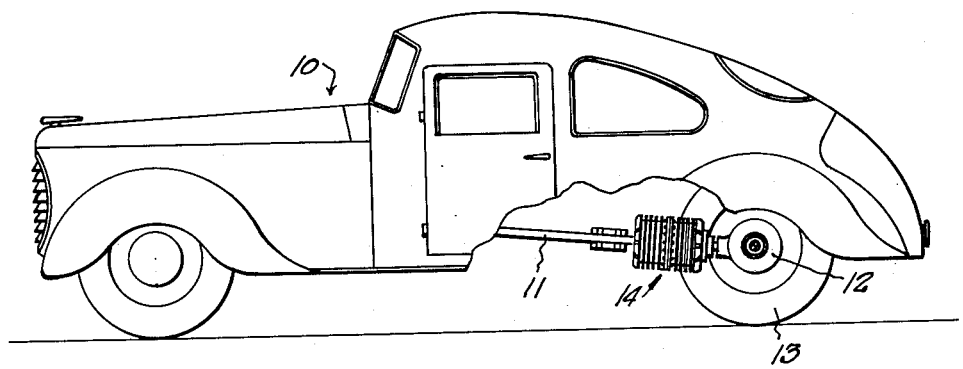
Fig. 1 is a side view of an automobile with parts broken away to illustrate one application of my invention thereto.

Referring to the drawings, which illustrate the preferred embodiment of the invention, the numeral 10 designates an automotive vehicle having a torque tube drive 11 leading to the differential 12 interposed in the axle (not shown) for the rear wheels 13. My device is interposed in the torque tube drive 11, as illustrated at 14, although it will be understood that this positioning is illustrative only and that the device may be located at other positions in the drive transmission line from the engine to the driven wheels and may be used for purposes other than in vehicle drives. For example, it may be used in any drive transmission line between a prime mover and a machine or unit to be operated by said prime mover, whether those parts be stationary as in industrial installations or mounted upon a movable base or support. Application of the invention to an automobile has been selected for purposes of illustration only, and it will be understood that the use of the device is not limited to vehicular applications.

Figure 2:
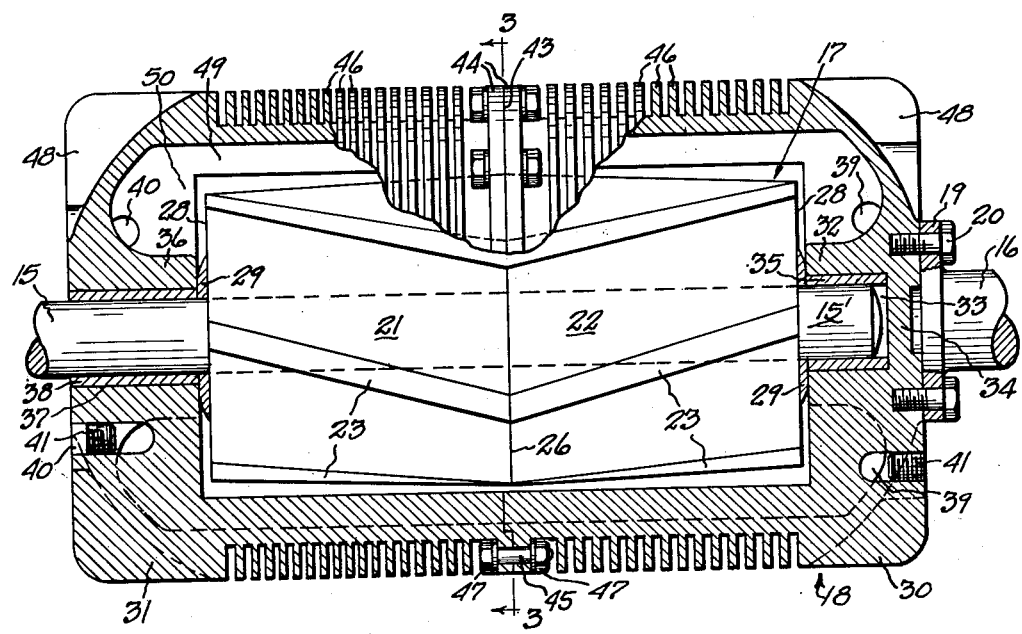
Fig. 2 is a longitudinal sectional view of the device taken on line 2—2 of Fig. 7.

The general assembly and relation of the parts is best illustrated in Fig. 2 and comprises a pair of axially aligned shafts 15 and 16 of which the shaft 15 is designated the driving shaft for purposes of discussion herein. A rotor 17 is fixedly mounted upon the driving shaft 15 and is received in the cavity of a sealed housing 18 to which the driven shaft 16 is fixedly secured, as by means of a flange 19 on the shaft, which is secured to the housing 18 by bolts 20.

Figure 3:
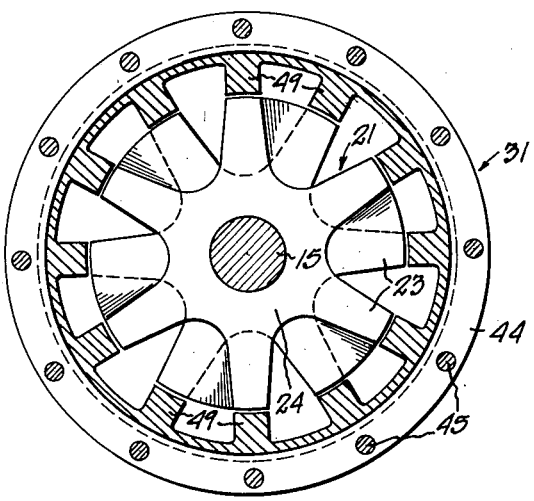
Fig. 3 is a transverse sectional view of the device taken on line 3—3 of Fig. 2.
Figure 5:
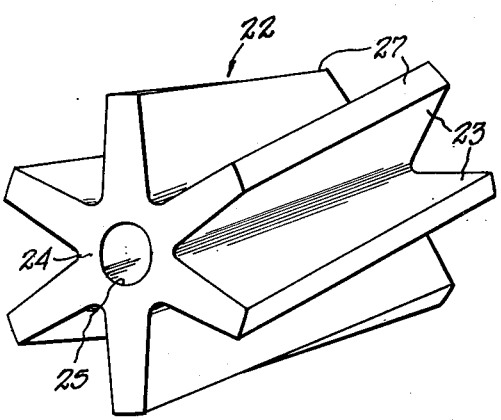
Figs. 4 and 5 are perspective views of the two parts of the driving rotor.
Figure 4:
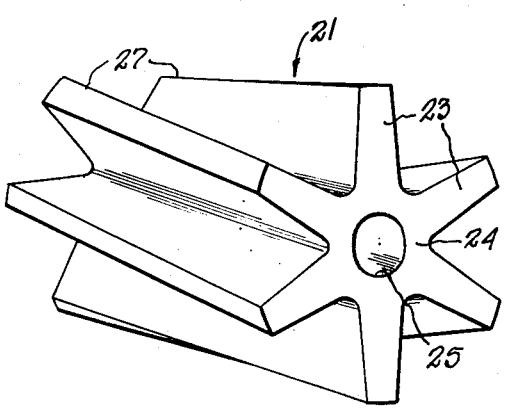
Figure 6:
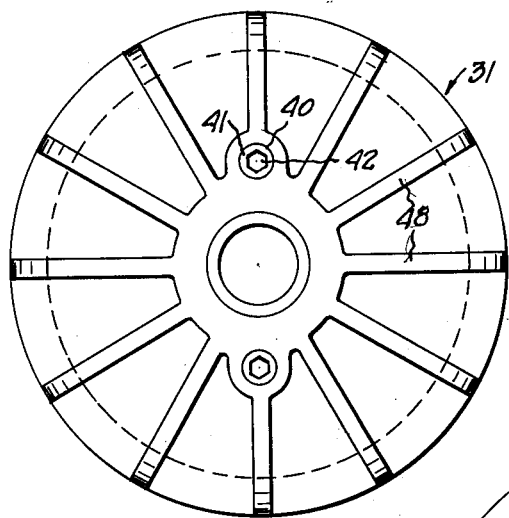
Fig. 6 is an end view of the device as viewed from the left in Fig. 2.
Figure 7:
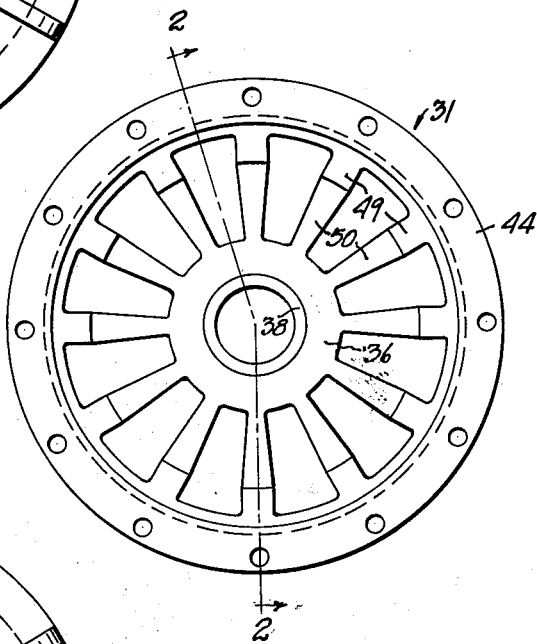
Fig. 7 is an end view of one section of the rotor housing, looking in the direction of the arrows at line 3—3 of Fig. 2.
Figure 8:
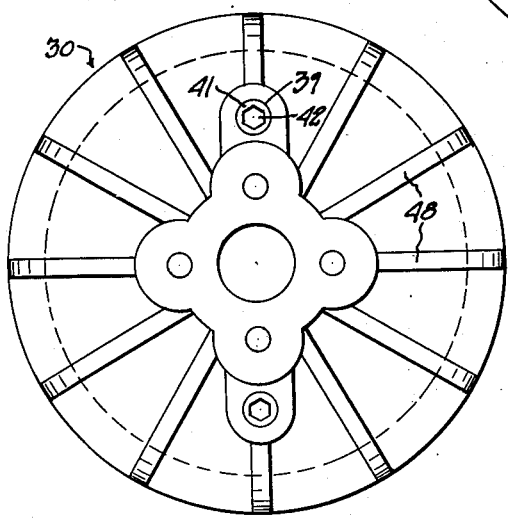
Fig. 8 is an end view of the device as viewed from the right in Fig. 2.

The construction of the rotor 17 is best illustrated in Figs. 2 to 5 and comprises two complementary rotor sections, 21 as illustrated in Fig. 4, and 22 as illustrated in Fig. 5. Each of the rotor sections or units is substantially star-shaped in cross-section to define a plurality of radial vanes 23 extending generally longitudinally of each of the sections and projecting from a central or hub portion 24 which is provided with an axial bore 25 adapted to fit snugly upon the shaft 15. The two rotor sections 21 and 22 are fixedly secured upon the shaft 15 as by welding or splining thereof to the shaft, or by any other means found suitable. The vanes 23 of the two rotor sections 21 and 22 extend substantially the full length of said sections and abut at their inner ends or faces along the parting plane 26, and the ends of the vanes 23 at said parting plane preferably register accurately. The vanes 23 of the two sections extend equiangularly from the hubs 24 and are of the same number in the two rotors and of the same size and shape but are arranged oppositely to each other. The vanes are of slightly helical shape so that one end thereof is displaced circumferentially relative to the opposite end thereof. The extent or radial angle of this displacement between opposite ends of each vane is preferably equal to one-half the angular displacement between adjacent vanes. This arrangement and proportioning of the parts is best illustrated in Fig. 3, wherein the rotor 21 is viewed at its end. By virtue of the fact that the vanes are of helical formation and are arranged oppositely with their inner ends in registry, the rotor has a double helical or herringbone shape, as best seen in Fig. 2. The outer longitudinal edges 27 of each rotor are each spaced from the axis of the rotor the same distance throughout their full extent. The end edges 28 of the rotors preferably lie in planes transverse of the rotor and exactly perpendicular to the axis of the rotor. The rotor is preferably mounted upon the shaft 15 spaced from the end of said shaft and rotates therewith. Bearing collars 29 are secured at the opposite ends of the rotor unit for purposes to be set forth hereinafter.

The rotor units 17 have been illustrated in Fig. 2 hereof as being of substantially greater length than diameter. This is illustrative of one embodiment of the invention but is not intended to be limiting, and rotors for some purposes may be of greater diameter than length. The advantage of the illustrated elongated rotor is that its cross-sectional size may be held to a minimum much less and smaller than the size of the rotors of conventional fluid couplings or other hydraulic drive devices.

The housing 18 is preferably formed of two cup-shaped parts 30 and 31, as best seen in Fig. 2. These parts are preferably of substantially the same size and are shaped similarly except at the ends thereof. The depth of each cup-shaped part is preferably substantially greater than the length of each of the rotor sections 21 and 22, so that the ends of the housing are spaced outwardly from the ends of the rotor. Similarly, the inner diameter of each of the housing parts is greater than the vane diameter of the rotor. The housing section 30 has a central internal hub 32 projecting longitudinally thereof and co-axially therewith. This hub has a cylindrical co-axial socket 33 formed therein for the major portion of its extent and whose inner end is defined by the web 34 preferably forming an integral part of the end of the housing 30. A bushing or bearing 35 is received in the socket 33 and serves to journal the end portion 15' of the shaft 15 which projects beyond the rotor and the rotor collar 29, as illustrated at the right in Fig. 2. A central inwardly projecting co-axial hub 36 is formed at the end of the housing section 31 and has a co-axial bore 37 therethrough which receives a bearing or bushing 38 which journals the portion of the shaft immediately adjacent the opposite end of the rotor 17. The outer ends of the housing parts 30 and 31 are provided with one or more ports 39 and 40, respectively, opening into the interior cavities of the cup-shaped housing parts and adapted to be sealed by plugs 41 which are preferably screw-threaded therein and which may be provided with tool-receiving sockets 42 at their ends to facilitate application and removal of said plugs. The ports 39 and 40 constitute filling openings to facilitate the filling of the device with liquid. The two housing parts 30 and 31 preferably have stepped faces at their open ends which interfit and define the parting plane 43. Flanges 44 projecting radially outwardly at the open ends of the housing parts are clamped or bolted together by bolts 45. Any suitable means, such as gaskets (not shown) and accurate interfitting engagement of the stepped end faces is relied upon to render the casing liquid-tight or sealed. The two housing parts are preferably externally ribbed, the construction illustrated utilizing a plurality of circumferential ribs 46 which serve as heat transfer elements or as cooling fins. The circumferential positioning of these fins is preferred to reduce the resistance to rotation. In order to facilitate the bolting together of the housing sections, the bolts may be studs which are threaded at both ends to mount individual nuts 47. The ends of the housing are also preferably provided with external ribs or vanes 48 which facilitate heat transfer.

The interior of the housing is provided with a plurality of longitudinal ribs or vanes 49 which are positioned radially and whose number is preferably equal to twice the number of vanes on the rotor 17. The ribs 49 are equiangularly disposed and their inner faces are positioned to have a slight clearance with the outer edges 27 of the rotor vanes, as best seen in Fig. 3. End vanes 50 extend radially of the housing between the hubs 32 and 36 and the ribs 49 with which said ribs 50 are integral.

It will be apparent from the construction of the device, as above described, that the rotor is positioned concentrically within the housing 18 and the concentricity of the parts is assured by journaling the shaft 15 which mounts the rotor in bushings or bearings carried by the housing. As the device operates, the rotation of the rotor rotates the liquid in the device and causes the same to impinge against the vanes 49 and 50 of the housing to transmit the torque of the driving shaft to the housing 18 upon the driven shaft. A device of the character described, wherein the vanes extend substantially parallel to the axis of rotation instead of at right angles thereto as has been conventional heretofore, facilitates the provision of an efficient device of elongated character whose diameter is small compared to the diameter of previous devices. In such an elongated device as illustrated, the liquid or viscous fluid drive transmitting material employed may be of greater density than the liquid customarily used in devices of this character. The consistency of the material may vary from a free flowing to a semi-solid condition according to the requirement of operation. It may consist of a single substance or a mixture or compound of several substances to obtain the desired degree of viscosity. For instance, it is possible in a device of this character to use a semi-fluid or grease or heavy oil, especially in units whose diameter is relatively large. However, if the diameter of the unit is to be held to a minimum, a material of greater viscosity is required for best results. Such materials of high viscosity may be materials such as castor oil, resinous substances, bituminous substances, such as mineral pitch, or a combination or mixture of these substances. Of course, it will be apparent that the operating characteristics of the device will vary according to the viscosity of the substance employed, thus making it possible to obtain practically any operating characteristic. This is highly advantageous since it increases the range of possible application of the device to meet the need to which it is to be applied if within the capacity of the device with respect to size.

Hydraulic drive devices or fluid couplings are subject to an action known as "slip" or shearing action which occurs whenever the driving and the driven parts of the device rotate at different speeds. The greater the amount of such slip or shearing action, the greater the translation into heat of the power applied. The maximum translation of power into heat naturally occurs at the lower speeds of rotation when the centrifugal force and the velocity of the liquid are low and cannot convert or translate any substantial percentage of the power applied thereto into rotation of the driven part. Therefore, it is desirable to obtain a rapid acceleration of the driven rotor in starting a device in order to reduce the time required for the driven element to achieve desired speed and also in order to reduce the heat generation caused by slippage to the lowest extent possible. This unit accomplishes this result with its use of a viscous liquid whose mass and small tendency to flow freely provide factors which, when combined with velocity and centrifugal force, reduce the slippage and shearing action even at low rotative speeds.

Another advantage of the device is that whatever heat may be generated is radiated from the cooling fins 46, 48 to be rapidly dissipated. This rapid heat dissipation will minimize any tendency for vaporizing pressures to be generated and entrapped within the unit, inasmuch as it will tend to hold the operating temperature of the device below the temperature required to vaporize the liquid. The substantial absence of vapor pressure conditions permits the construction of the device from relative lightweight material. This lightweight construction, coupled with simplicity of structure, holds the cost of the unit low.

The device has a cushioning action due to the relation and angular displacement of the fins of the rotor with relation to the angular displacement of the ribs or fins of the driven housing. This action entirely avoids the possibility of the generation of impulses during the operation incident to slippage between the driving and driven parts. The herringbone construction of the vanes insures that some one or more parts of each of the vanes are always so related to the driven vanes as to be at maximum torque-transmitting relation thereto. In other words, at no time during operation and rotation of the device are the vanes of the rotor so related or positioned with respect to the vanes or ribs of the driven member that effective torque transmission is momentarily lost. Thus it will be observed from Fig. 3 that, though the opposite end portions of each vane are substantially radially aligned with adjacent vanes of the housing at this rotative position, the intermediate portions of the rotor vanes are positioned intermediate the vanes of the housing in a torque-transmitting relation. This advantageous positioning of one or more points of each vane in torque-transmitting relation occurs in all rotative positions of the rotor with respect to the housing.

Another important factor in this device is the length of the rotor which permits reduction to a relatively small size of the diameter of the rotor and the vanes of both the driving and the driven parts. In other words, though the peripheral speed of the tips of the rotor vanes is small compared to the speed of a device of larger diameter rotating the same number of revolutions per unit of time, the elongation of the rotor increases the area of the vanes effective to produce the torque transmitting movement of the liquid and produces results comparable with standard devices of much larger diameter. It will be observed further that the vanes of the driven member are not limited in extent to the longitudinal vanes 49 which confront the edges of the rotor vanes but includes also the vanes 50 in the annular end portions of the housing chamber which confront the ends of the vanes of the rotor. This serves to increase to a maximum the rotation producing surfaces against which the torque transmitting liquid may act and serves to reduce, even at low speeds, the rotative slip between the driving and the driven parts. The combination of the two factors of the side and end confronting of vanes of the driven member relative to the vanes of the driving member, coupled with the use of a heavy liquid of higher viscosity than can be used in previous devices, serves the dual purpose of reducing slip at low rotative speed and of accelerating the driven portion rapidly. It will also be apparent that when diameters of the parts of a device of this character are reduced, the centrifugal force acting thereon is similarly reduced, whereby the structure, free from such high centrifugal forces, can be made of light weight and of lower strength than standard devices.

While this device has been designed for and illustrated as applied to an automobile in conjunction with a standard transmission, it is possible to start and operate the automobile on high gear alone, except when a reverse operation is desired. Thus, if desired, the transmission can be simplified by providing only high and reverse gears therein. Alternatively, the device may be operated without any gear transmission and only a reverse gear need be employed in its stead. In an automobile the cushion effect or action of the device referred to above avoids and eliminates shock, stress and strain on all rotating parts and thereby prolongs the life of rotating parts and reduces the danger of breakage thereof.

There are many industrial applications for operating special types of machines and equipment wherein this hydraulic drive device would add to the life and efficiency of such equipment because of the cushion drive mentioned which would avoid and eliminate shock, stress and strain now commonly encountered as incident to the use of a rigid or gear drive.

While the preferred embodiment of the invention has been illustrated and described herein, it will be understood that changes may be made in the device within the scope of the appended claims without departing from the spirit of the invention.

I claim:

1. A rotary turbine type fluid coupling comprising a driving shaft, a driven shaft, a rotor secured to one shaft, and a liquid-containing rotor housing secured to the other shaft and journaling said rotor shaft, a liquid of substantially semi-solid consistency contained in said housing, said housing being sealed and having a cylindrical cavity and a plurality of longitudinal radial equi-spaced similar ribs projecting into said cavity throughout the length of said cavity, the inner edges of said ribs being equi-spaced from the axis of said housing throughout their lengths, said rotor having peripheral elongated radial vanes whose central portions are circumferentially deflected relative to their end portions substantially equal to the angular displacement of adjacent ribs of said housing, said vanes having uniform radial dimensions throughout their lengths.

2. A rotary turbine type fluid coupling comprising a driving shaft, a driven shaft, a rotor secured to one shaft, and a liquid-containing rotor housing secured to the other shaft and journaling said rotor shaft, said housing being sealed and having a cylindrical cavity, and a plurality of longitudinal radial equi-spaced similar ribs projecting into said cavity throughout the length of said cavity and each of uniform radial dimension throughout its length, said rotor having similar peripheral elongated radial vanes whose central portions are circumferentially deflected relative to their end portions substantially equal to the angular displacement of adjacent ribs of said housing, the number of said ribs being twice the number of said vanes, each of said vanes being of uniform radial dimension throughout its length.

HARLIE OGDEN PUTT.

REFERENCES CITED

The following references are of record in the file of this patent:

UNITED STATES PATENTS

| Number | Name | Date |
| --- | --- | --- |
| 843,874 | Dörwald | Feb. 12, 1907 |
| 1,125,593 | Pinckney | Jan. 19, 1915 |
| 1,199,359 | Föttinger | Sept. 26, 1916 |
| 1,224,669 | Rounds | May 1, 1917 |
| 1,546,323 | Spowage | July 14, 1925 |
| 1,653,360 | Howard | Dec. 20, 1927 |
| 1,746,148 | Eaton | Feb. 4, 1930 |
| 1,918,163 | Wohlenhaus | July 11, 1933 |
| 1,940,918 | Petroni et al. | Dec. 26, 1933 |
| 2,203,177 | Patterson | June 4, 1940 |
| 2,259,208 | Hutchison | Oct. 14, 1941 |

FOREIGN PATENTS

| Number | Country | Date |
| --- | --- | --- |
| 6,787 | Great Britain | Mar. 19, 1912 |
| 16,785 | Great Britain | July 18, 1912 |
| 86,251 | Switzerland | Aug. 16, 1920 |